United States Patent
Kim

(10) Patent No.: US 10,559,808 B2
(45) Date of Patent: Feb. 11, 2020

(54) LITHIUM SECONDARY BATTERY HAVING IMPROVED SAFETY BY USING BIMETAL TAB

(71) Applicant: LG Chem, Ltd., Seoul (KR)

(72) Inventor: Dong-Kyu Kim, Daejeon (KR)

(73) Assignee: LG Chem, Ltd. (KR)

( * ) Notice: Subject to any disclaimer, the term of this patent is extended or adjusted under 35 U.S.C. 154(b) by 144 days.

(21) Appl. No.: 15/557,299

(22) PCT Filed: Apr. 29, 2016

(86) PCT No.: PCT/KR2016/004523
§ 371 (c)(1),
(2) Date: Sep. 11, 2017

(87) PCT Pub. No.: WO2016/175606
PCT Pub. Date: Nov. 3, 2016

(65) Prior Publication Data
US 2018/0062151 A1    Mar. 1, 2018

(30) Foreign Application Priority Data

Apr. 30, 2015 (KR) .................. 10-2015-0061976
Apr. 28, 2016 (KR) .................. 10-2016-0052491

(51) Int. Cl.
*H01M 2/34*   (2006.01)
*H01M 2/26*   (2006.01)
*H01M 10/0525*   (2010.01)

(52) U.S. Cl.
CPC ............ *H01M 2/348* (2013.01); *H01M 2/26* (2013.01); *H01M 10/0525* (2013.01); *H01M 2200/101* (2013.01)

(58) Field of Classification Search
None
See application file for complete search history.

(56) References Cited

U.S. PATENT DOCUMENTS 3,535,770 A * 10/1970 Crandell ............. A47G 21/04
228/165
2005/0266302 A1   12/2005 Kim
(Continued)

FOREIGN PATENT DOCUMENTS

JP    2009295565 A    12/2009
KR    20010095529 A    11/2001
(Continued)

OTHER PUBLICATIONS

Search report from International Application No. PCT/KR2016/004523, dated Aug. 19, 2016.
(Continued)

*Primary Examiner* — Lucas J. O'Donnell
(74) *Attorney, Agent, or Firm* — Lerner, David, Littenberg, Krumholz & Mentlik, LLP

(57) ABSTRACT

The present disclosure relates to a lithium secondary battery having improved safety. In the lithium secondary battery, the property of a bimetal bent in one direction at high temperature under an abnormal operating condition is used to cause a disconnection between an electrode tab and an electrode lead and to increase the internal resistance of a unit cell, thereby improving the safety of a lithium secondary battery.

11 Claims, 4 Drawing Sheets

(56) References Cited

U.S. PATENT DOCUMENTS

| | | |
|---|---|---|
| 2007/0170894 A1 | 7/2007 | Koike et al. |
| 2009/0130550 A1* | 5/2009 | Kim .................... H01M 2/0404 429/163 |
| 2009/0159311 A1 | 6/2009 | Zheng et al. |
| 2011/0104520 A1 | 5/2011 | Ahn |
| 2011/0183167 A1 | 7/2011 | Moon et al. |
| 2013/0089759 A1 | 4/2013 | Han et al. |
| 2013/0309537 A1 | 11/2013 | Zhao |

FOREIGN PATENT DOCUMENTS

| | | |
|---|---|---|
| KR | 20040099526 A | 12/2004 |
| KR | 20050113983 A | 12/2005 |
| KR | 100823144 B1 | 4/2008 |
| KR | 20110034489 A | 4/2011 |
| KR | 20110048470 A | 5/2011 |
| KR | 20110087843 A | 8/2011 |
| KR | 20130039178 A | 4/2013 |
| KR | 20130042954 A | 4/2013 |
| KR | 20150003866 A | 1/2015 |

OTHER PUBLICATIONS

Supplementary European Search Report for EP Application No. 16786792, dated Sep. 11, 2018.

* cited by examiner

LITHIUM SECONDARY BATTERY HAVING IMPROVED SAFETY BY USING BIMETAL TAB

CROSS-REFERENCE TO RELATED APPLICATIONS

The present application is a national phase entry under 35 U.S.C. § 371 of International Application No. PCT/KR2016/004523, filed Apr. 29, 2016, which claims priority from Korean Patent Application No. 10-2015-0061976, filed Apr. 30, 2015 and Korean Patent Application No. 10-2016-0052491, filed Apr. 28, 2016, the disclosures of which are hereby incorporated herein by reference.

TECHNICAL FIELD

The present disclosure relates to a lithium secondary battery having improved safety by using a bimetal tab.

BACKGROUND ART

As technological development and demand of mobile instruments have been increased, demand of secondary batteries as energy sources has been increased rapidly. Particularly, many studies about lithium secondary batteries having high energy density and discharge voltage among such secondary batteries have been conducted actively. In addition, lithium secondary batteries have been commercialized and used widely.

The lithium secondary batteries are classified, depending on the composition or form of an electrolyte, into lithium ion batteries, lithium ion polymer batteries, lithium polymer batteries, or the like. The lithium ion batteries have a structure in which a cathode/separator/anode is wetted with a lithium electrolyte solution. The lithium polymer batteries use a solid electrolyte as an electrolyte so that the solid electrolyte may also function as a separator. The lithium ion polymer batteries are in the medium between the lithium ion batteries and the lithium polymer batteries, and have a structure in which a cathode and anode are bound to a separator and a lithium electrolyte is injected thereto.

The lithium secondary batteries may be classified, depending on the shape of a battery casing, into a cylindrical battery, prismatic battery and a pouch-type battery. The cylindrical battery and prismatic battery have a structure including an electrode assembly received in a metallic can, and the pouch-type battery has a structure including an electrode assembly received, for example, in a pouch-type casing made of an aluminum laminate sheet.

One of the main study subjects of such secondary batteries is to improve the safety. For example, when a temperature of secondary battery rises due to abnormal operating states, such as an overcharged state exceeding an acceptable current and voltage, or exposure to high temperature, the electrolyte becomes electrochemically unstable and may be decomposed, resulting in deformation of the outer shape of the battery or an internal short-circuit. In a severe case, ignition or explosion of the battery may occur.

Particularly, the safety issue becomes more important because of a tendency to increase the energy density and discharge voltage in order to satisfy the demand of high-output large-capacity secondary batteries. Therefore, various attempts have been made on the technology of consuming charging energy by installing an electric resistance on a circuit carrying current upon the generation of abnormalities of batteries.

However, there is still a need for a solution of safety issue of a lithium secondary battery at high temperature under an abnormal operating condition.

DISCLOSURE

Technical Problem

The present disclosure is directed to providing a lithium secondary battery having improved safety by means of disconnection being caused at a weld zone between an electrode tab and an electrode lead at high temperature under an abnormal operating condition.

Technical Solution

In one aspect of the present disclosure, there is provided a lithium secondary battery including: a cathode plate, separator and an anode plate stacked successively; electrode tabs extended from one side of each of the cathode plate and the anode plate by a predetermined length; and electrode leads electrically connected to the electrode tabs, wherein there is a weld zone welding a surface of the electrode tabs to a surface of the electrode leads in at least a partial region under a normal operating condition, and disconnection is caused at the weld zone between the electrode tabs and the electrode leads at high temperature under an abnormal operating condition.

According to an embodiment of the present disclosure, the electrode tab may be a bimetal tab formed of a bimetal and may be a cathode tab, anode tab or both.

According to another embodiment of the present disclosure, a bimetal tab may be further attached onto the electrode tab.

According to still another embodiment of the present disclosure, the bimetal tab may consist of a metal having a larger heat expansion coefficient and a metal having a smaller heat expansion coefficient, wherein the metal having a larger heat expansion coefficient may be disposed toward the electrode lead.

According to still another embodiment of the present disclosure, the metal having a larger heat expansion coefficient may be a copper/zinc alloy, nickel/molybdenum/iron alloy or a nickel/manganese/iron alloy.

According to still another embodiment of the present disclosure, the metal having a smaller heat expansion coefficient may be a nickel/iron alloy.

According to still another embodiment of the present disclosure, the bimetal tab may be welded to the electrode lead or electrode tab, weld area amounting to 50-80% of the total area of the overlap with the electrode lead or electrode tab.

According to still another embodiment of the present disclosure, the weld zone may be formed in a continuous pattern or discontinuous pattern.

According to yet another embodiment of the present disclosure, the high temperature may be a temperature of 90-130° C.

In another aspect of the present disclosure, a medium- and large-size battery pack including the lithium secondary battery as a unit cell is provided.

Advantageous Effects

According to the present disclosure, the particular property of a bimetal, that is, curving in one direction at high temperature under an abnormal operating condition, is used to cause a disconnection between an electrode tab and an electrode lead and to increase the internal resistance of a unit cell, thereby improving the safety of a lithium secondary battery.

According to the present disclosure, it is possible to control a degree of safety of a lithium secondary battery depending on increase of the internal resistance of a unit cell in a predetermined temperature range by adjusting the material of a bimetal tab and weld zone.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1A:
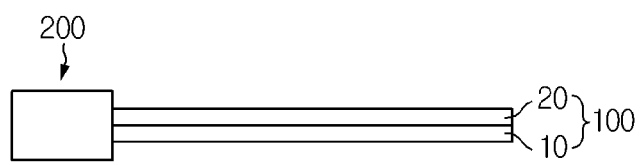
FIG. 1a is a side view illustrating a bimetal tab one surface of which is attached to an adhered surface under a normal temperature condition.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a lithium secondary battery including: a cathode plate, separator and an anode plate stacked successively; electrode tabs extended from one side of each of the cathode plate and the anode plate by a predetermined length; and electrode leads electrically connected to the electrode tabs, wherein there is a weld zone welding the electrode tabs to the electrode leads in at least a partial region under a normal operating condition, and disconnection is caused at the weld zone between the electrode tabs and the electrode leads at high temperature under an abnormal operating condition.

The present disclosure includes a first embodiment wherein a bimetal tab is used as an electrode tab and a second embodiment wherein an electrode tab generally used in the art is used and a bimetal tab is further attached onto the electrode tab. Hereinafter, unless otherwise stated, it should be understood that an electrode tab or bimetal tab means the electrode tab or bimetal tab in the first embodiment.

The bimetal tab is obtained by laminating and joining two metal plates having a different heat expansion coefficient. Such bimetal tab curves variably toward one direction when a temperature of a battery comprising the bimetal tab rises to a predetermined critical temperature due to continuous current flow such as deep discharge or overcharge.

According to an embodiment of the present disclosure, the bimetal tab consists of a metal/metal alloy having a larger heat expansion coefficient and a metal/metal alloy having a smaller heat expansion coefficient as the upper part and the lower part, respectively. In addition, the bimetal tab is applied to a battery cell so that the metal having a larger heat expansion coefficient faces the electrode lead. Then, when the battery reaches high temperature due to an abnormal operating condition, the bimetal tab curves so that the metal having a smaller heat expansion coefficient is inward located. Thus, the bimetal tab used as the electrode tab is disconnected from the electrode lead.

As used herein, 'disconnection' means not only an embodiment wherein a bimetal tab used as an electrode tab is completely separated from an electrode lead but also an embodiment wherein a bimetal tab is separated from an electrode lead by less than 1 mm Such minor separation can affect the safety of a battery.

To what extent that the bimetal tab curves in a predetermined direction can be controlled by means of a desired temperature of disconnection, materials or combination of metal/metal alloy forming the bimetal tab, total thickness of the bimetal tab, thickness ratio of the upper part to the lower part of the bimetal tab, area of the bimetal tab which is welded to an electrode lead, and pattern of weld zone, in addition to the overall design of a lithium secondary battery.

The electrode lead used herein may include a material used generally in the art. In addition, in the second embodiment wherein a bimetal tab is attached to an electrode tab, the electrode tab may also include a material used generally in the art.

The desired temperature of disconnection between the electrode tab and the electrode lead means a high temperature under an abnormal operating condition. For example, the temperature may range from 80° C. to 130° C. or from 90° C. to 135° C. According to an embodiment of the present disclosure, the bimetal tab operates at a battery temperature of 80° C. or higher, thereby ensuring the safety of a battery.

According to another embodiment of the present disclosure, the bimetal tab has a structure including two layers, or three layers or more of metal/metal alloy. According to still another embodiment of the present disclosure, the bimetal tab may have a thickness of from 0.1 mm to 1 mm.

In the bimetal tab, non-limiting examples of the metal having a smaller heat expansion coefficient include a nickel/iron alloy, but are not limited thereto. In addition, non-limiting examples of the metal having a larger heat expansion coefficient include a copper/zinc alloy, nickel/molybdenum/iron alloy and nickel/manganese/iron alloy, but are not limited thereto. The bimetal tab including such a material may be used as a cathode tab, anode tab or both, or may be attached to a cathode tab, anode tab or both.

Since the upper part and the lower part in the bimetal tab should undergo different heat expansion, respectively at high temperature under an abnormal operating condition and could cause disconnection from the electrode lead, it is preferable that the bimetal has a total thickness of 0.1 mm to 1 mm.

According to still another embodiment, the metal having a larger heat expansion coefficient and the metal having a smaller heat expansion coefficient may have the same thickness.

An area of weld zone between the electrode tab and the electrode lead may amount to 50-80% based on the total area of the overlap between the electrode tab and the electrode lead. In the case of the second embodiment where the bimetal tab is further attached onto a conventional electrode tab, weld zone may be formed with an area of 50-80% based on the total area of the overlap between the bimetal tab and the electrode tab. When the area of the weld zone is less than 50%, electric resistance may increase even under a normal condition. When the area is larger than 80%, an effect of modulating electric resistance is insignificant.

The pattern of weld zone between the electrode tab and the electrode lead may be optional depending on a desired temperature where a disconnection between the electrode tab and the electrode lead is to occur. Thus, shape or area of weld zone is not particularly limited, as long as it satisfies the purpose of the subject invention. For example, a continuous or discontinuous weld zone may be formed.

The method for welding the electrode tab to the electrode lead may be one used generally in the art and there is no particular limitation. For example, the welding method may include an electric resistance welding, spot welding, seam welding, ultrasonic welding, laser welding, electron beam welding or arc welding, but is not limited thereto.

The battery according to the present disclosure may be applied to a wide range of secondary batteries which undergo repeated charge/discharge regardless of the shapes and types thereof. Preferably, the battery according to the present disclosure may be a lithium secondary battery having high energy density and discharge voltage.

The secondary battery may have a structure including a battery cell received in a pack casing, and the connection member may be surrounded with the pack casing while it is attached to the outer surface of the battery casing.

In another aspect of the present disclosure, there is also provided a medium- and large-size battery pack including the lithium secondary battery as a unit cell.

In the medium- and large-size battery pack having a plurality of unit cells packed compactly, if a part of unit cells has problem, effects of such problem can spread to the other unit cells significantly, and thus safety problem becomes more serious. Therefore, when the secondary battery ensuring safety as a unit cell according to the subject invention is used, the safety problem can be solved fundamentally.

Structure for the medium- and large-size battery and its manufacturing method are known to those skilled in the art and description thereof will be omitted herein.

Hereinafter, the present disclosure will be explained in more detail with reference to the accompanying drawings but the scope of the present disclosure is not limited thereto.

FIG. 1a is a side view illustrating a bimetal tab 100 one surface of which is attached to an adhered surface 200 under a normal temperature condition. The bimetal tab 100 includes a metal/metal alloy 10 having a larger heat expansion coefficient as the lower part thereof and a metal/metal alloy 20 having a smaller heat expansion coefficient as the upper part thereof. The bimetal tab 100 is present horizontally as a whole.

Figure 1B:
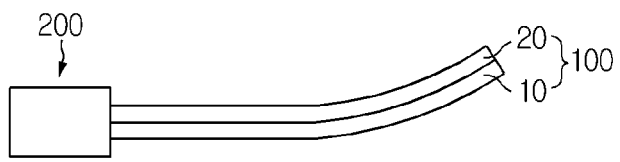
FIG. 1b is a side view illustrating a bimetal tab one surface of which is attached to an adhered surface at high temperature under an abnormal operating condition.

FIG. 1b is a side view illustrating a bimetal tab 100 one surface of which is attached to an adhered surface 200 at high temperature under an abnormal operating condition. The bimetal tab 100 includes a metal/metal alloy 10 having a larger heat expansion coefficient as the lower part thereof and a metal/metal alloy 20 having a smaller heat expansion coefficient in the upper part thereof. In addition, the bimetal tab 100 curves toward the metal/metal alloy 20 having a smaller heat expansion coefficient, i.e. toward the top, as a whole.

Figure 2A:
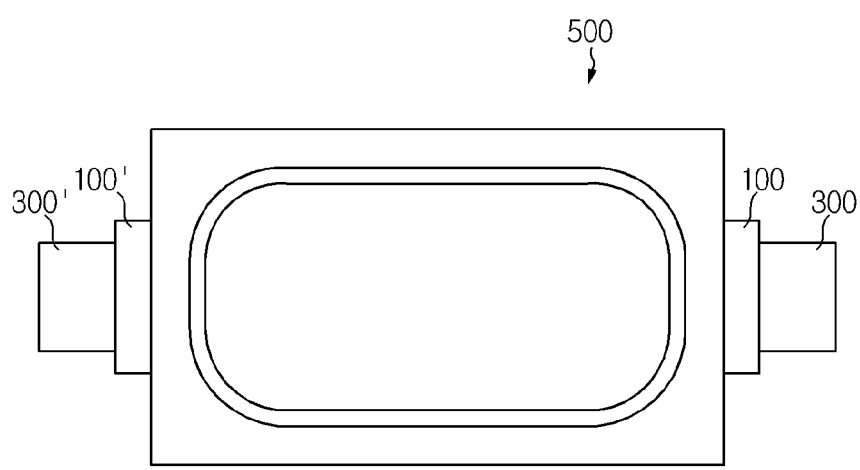
FIG. 2a and FIG. 2b are top views illustrating battery cells using a bimetal tab as an electrode tab.
Figure 2B:
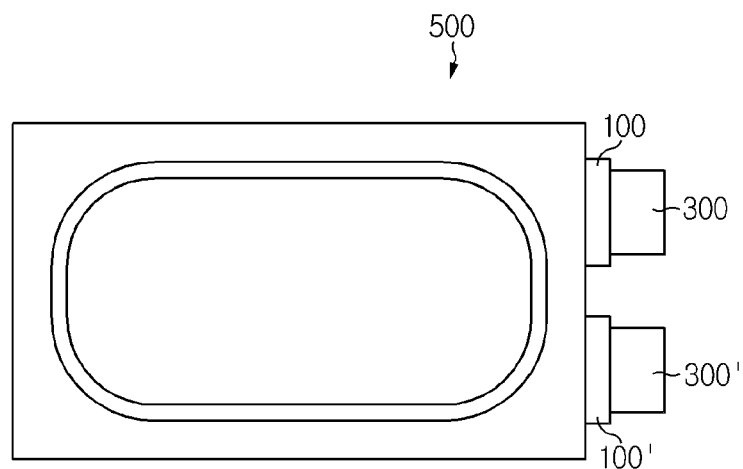
Figure 3A:
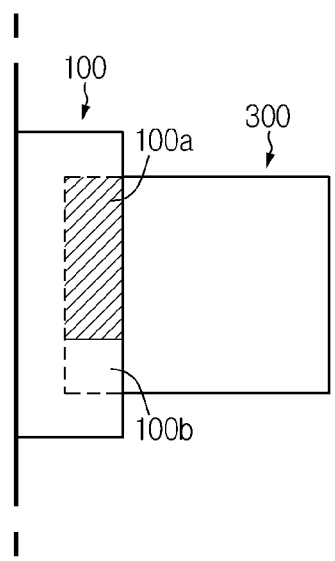
FIGS. 3a to FIG. 3d are schematic side views illustrating a bimetal tab used as an electrode tab and welded to an electrode lead.
Figure 3B:
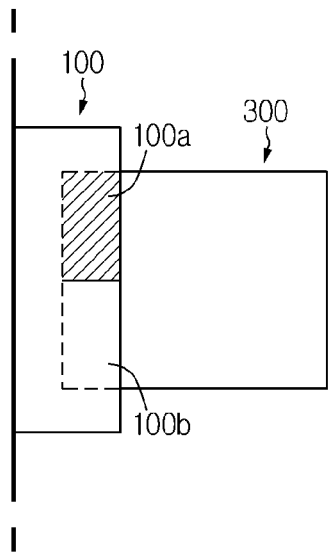
Figure 3C:
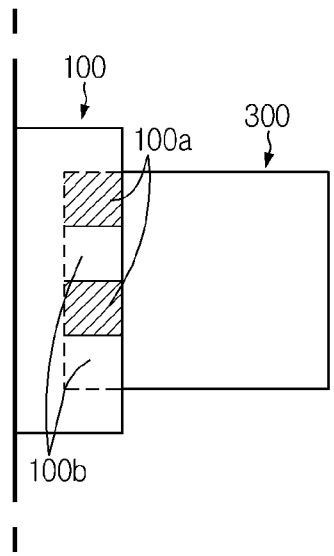
Figure 3D:
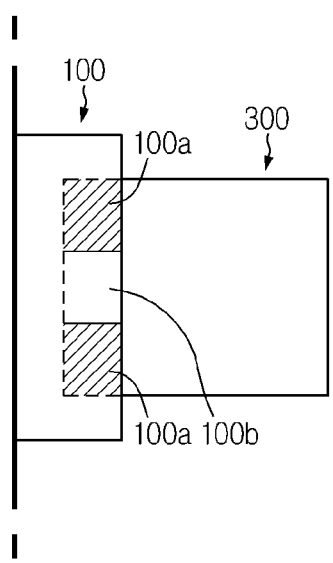

FIG. 2a illustrates an embodiment wherein bimetal tabs 100, 100' are used as electrode tabs and are welded to a cathode lead/anode lead 300, 300' on an opposite side of the battery cell. In addition, FIG. 2b illustrates an embodiment wherein bimetal tabs 100, 100' are used as electrode tabs and are welded to a cathode lead/anode lead 300, 300' on the same side of the battery cell.

FIGS. 3a to 3d are schematic side views illustrating a bimetal tab used as an electrode tab and welded to an electrode lead. The welding pattern of the bimetal tab 100 to the electrode lead 300 may be a continuous pattern in which a weld zone 100a is formed continuously, or a discontinuous pattern in which a non-weld zone 100b is interposed between two weld zones 100a.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A lithium secondary battery comprising: a cathode plate, a separator, and an anode plate stacked successively; electrode tabs extended from one side of each of the cathode plate and the anode plate by a predetermined length; electrode leads electrically connected to the electrode tabs; and at least one bimetal tab defined by two metal plates laminated and joined together, the two metal plates having different heat expansion coefficients from one another, wherein the at least one bimetal tab is attached to a first one of the electrode tabs or the first one of the electrode tabs comprises the bimetal tab, wherein the at least one bimetal tab overlaps at least one of the electrode leads to define an overlap region, wherein a surface of the at least one bimetal tab is welded to a surface of at least one of the electrode leads by a weld zone comprising at least a portion of the overlap region, and wherein, at a predetermined high temperature indicating an abnormal operating condition, the at least one bimetal tab is configured to deflect due to differential heat expansion of the two metal plates such that the bimetal tab disconnects from the at least one of the electrode leads by separating from one another at the weld zone.

2. The lithium secondary battery according to claim 1, wherein the first electrode tab is a cathode tab.

3. The lithium secondary battery according to claim 1, wherein the one of the two metal plates having a larger heat expansion coefficient faces the at least one of the electrode leads.

4. The lithium secondary battery according to claim 3, wherein the one of the two metal plates having a larger heat expansion coefficient includes a copper/zinc alloy, a nickel/molybdenum/iron alloy or a nickel/manganese/iron alloy.

5. The lithium secondary battery according to claim 4, wherein the one of the two metal plates having a smaller heat expansion coefficient includes a nickel/iron alloy.

6. The lithium secondary battery according to claim 1, wherein the weld zone comprises 50-80% of the total area of the overlap region.

7. The lithium secondary battery according to claim 1, wherein the weld zone is formed in a continuous pattern.

8. The lithium secondary battery according to claim 1, wherein the predetermined high temperature is a temperature of 80-130° C.

9. A battery pack comprising the lithium secondary battery as defined in claim 1 as a unit cell.

10. The lithium secondary battery according to claim 1, wherein the first electrode tab is an anode tab.

11. The lithium secondary battery according to claim 1, wherein the weld zone is formed in a discontinuous pattern.

* * * * *